(12) United States Patent (10) Patent No.: US 8,960,779 B2
Nishimura et al. (45) Date of Patent: Feb. 24, 2015

(54) UPPER VEHICLE-BODY STRUCTURE OF VEHICLE

(71) Applicant: Mazda Motor Corporation, Hiroshima (JP)

(72) Inventors: Yoshikazu Nishimura, Hiroshima (JP); Kei Ikeda, Hiroshima (JP); Kazuya Fukutani, Hiroshima (JP); Naoki Kaneko, Hiroshima (JP); Noboru Yoshii, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/946,526

(22) Filed: Jul. 19, 2013

(65) Prior Publication Data

US 2014/0028057 A1 Jan. 30, 2014

(30) Foreign Application Priority Data

Jul. 30, 2012 (JP) ................. 2012-168161

(51) Int. Cl.
  *B62D 25/02* (2006.01)
  *B62D 25/06* (2006.01)
  *B62D 25/04* (2006.01)

(52) U.S. Cl.
  CPC ............... *B62D 25/06* (2013.01); *B62D 25/04* (2013.01)
  USPC ....................... 296/203.03; 296/30

(58) Field of Classification Search
  CPC ..................................... B62D 25/06
  USPC ................. 296/210, 203.01, 203.03, 30
  See application file for complete search history.

(56) References Cited

U.S. PATENT DOCUMENTS 8,678,484 B2 * 3/2014 Shono ................ 296/203.03
2009/0174220 A1 * 7/2009 Guo ................... 296/187.12
2011/0266837 A1 * 11/2011 Losch et al. ......... 296/193.06

FOREIGN PATENT DOCUMENTS

JP 2010-221825 A 10/2010

* cited by examiner

*Primary Examiner* — Dennis H Pedder
(74) *Attorney, Agent, or Firm* — Studebaker & Brackett PC

(57) ABSTRACT

An opening portion is formed at a specified portion of a roof gusset which covers part of a panel joint portion from below. A pair of center-pillar side joint portions is provided at an outward end portion of the roof gusset, which is joined to a center pillar directly or via another panel member. A pair of first high-rigidity portions is provided at specified portions of the roof gusset which overlap the opening portion in a vehicle width direction and overlap the center-pillar joint portions in the vehicle longitudinal direction, respectively. A second high-rigidity portion is provided at an inward end portion of the roof gusset to extend in the vehicle longitudinal direction.

4 Claims, 8 Drawing Sheets

FIG. 5
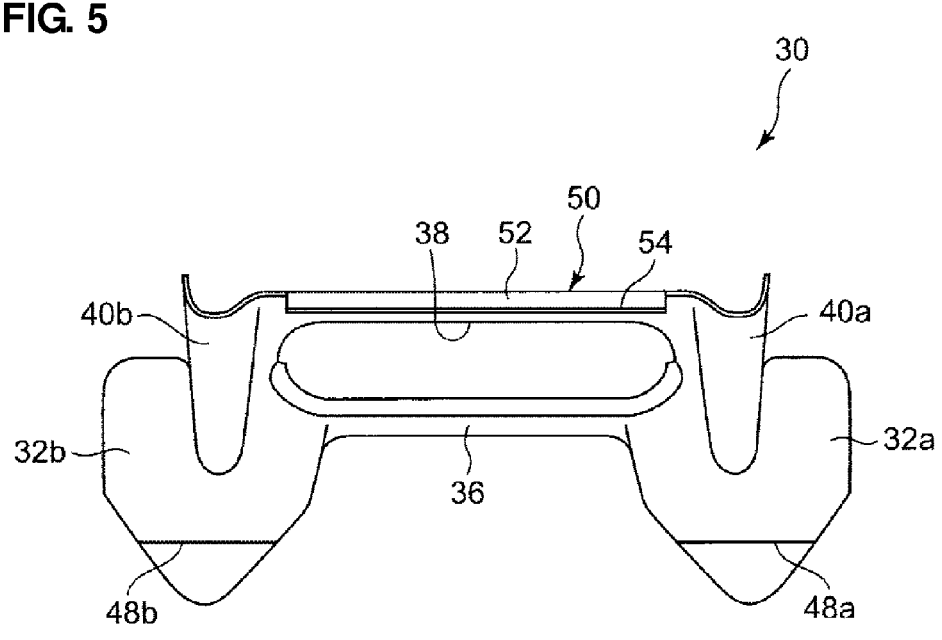
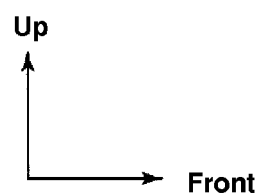

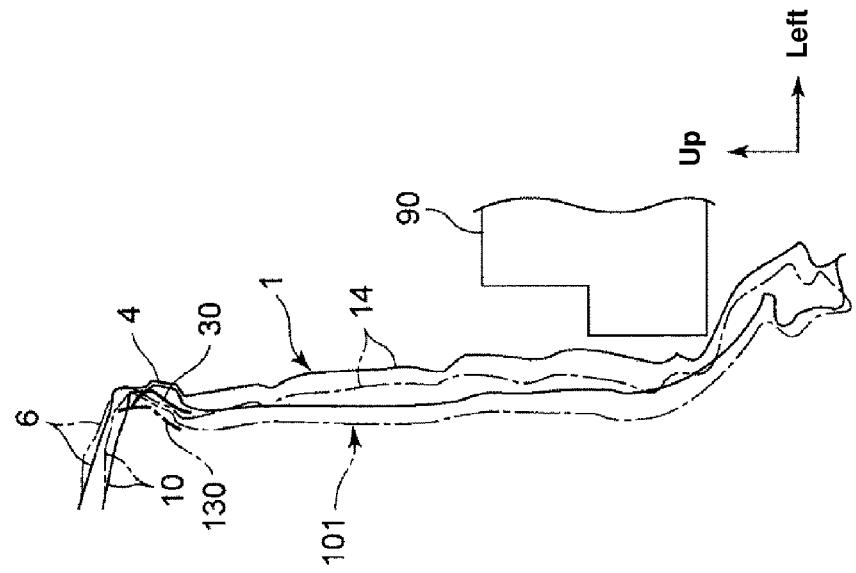
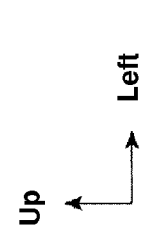
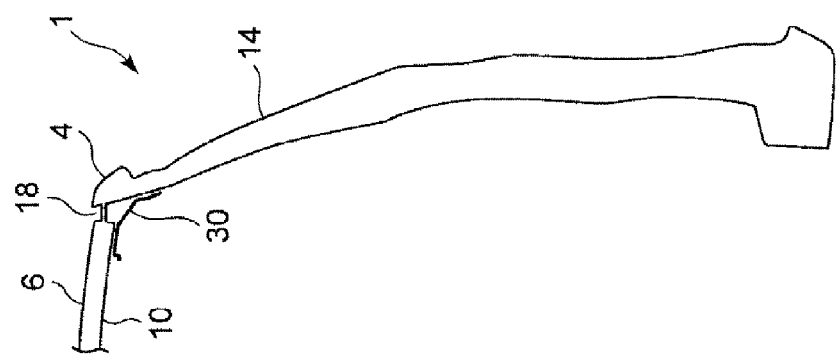
FIG. 6A
FIG. 6B

UPPER VEHICLE-BODY STRUCTURE OF VEHICLE

BACKGROUND OF THE INVENTION

The present invention relates to an upper vehicle-body structure of a vehicle, in which a roof gusset is attached so as to extend between a center pillar and a roof reinforcement.

In many automotive vehicles, plural roof reinforcements are provided to extend in a vehicle width direction between right and left roof rails extending in a vehicle longitudinal direction, so that the rigidity of a vehicle-body upper portion can be increased. To an upper face of the roof reinforcements is joined a roof panel by a thermosetting adhesive agent, for example.

Further, in many automotive vehicles, a Mohican-roof structure in which a Mohican portion formed in a groove shape is provided along a roof rail is applied to a roof portion thereof. In the Mohican portion, a flange portion of a roof panel and a flange portion of the roof rail are joined together by spot welding.

Moreover, as disclosed in Japanese Patent Laid-Open Publication No. 2010-221825, for example, some vehicles have a vehicle-body structure in which a roof gusset is attached so as to extend between a center pillar and a roof reinforcement provided at the same longitudinal position as the center pillar, so that an impact load inputted to the center pillar from a vehicle side is transmitted to the roof reinforcement via the roof gusset. According to the above-described vehicle-body structure, the impact load inputted to the center pillar can be effectively dispersed to the roof reinforcement, thereby restraining the center pillar from improperly coming into a vehicle compartment.

Meanwhile, in production lines of an automotive vehicle, the vehicle is manufactured through a vehicle-body assembling step, a painting step, and a vehicle assembling step, in order. The vehicle-body assembling step includes a step of assembling a vehicle-body side portion by combining a roof rail with a center pillar, a side sill and others, a step of assembling a vehicle-body upper portion with a roof reinforcement and a roof panel, a step of assembling the above-described vehicle-body side portion and the above-described vehicle-body upper portion, and so on. Accordingly, the above-described adhesion of the upper face of the roof reinforcement and the lower face of the roof panel, or the above-described spot welding of the roof panel and the roof reinforcement at the Mohican portion are conducted in the vehicle-body assembling step. Further, in a case in which the thermosetting adhesive agent is used as the adhesion between the roof reinforcement and the roof panel, this adhesive agent is cured by the heating conducted in the painting step, so that the lower face of the roof panel and the upper face of the roof reinforcement are perfectly joined to each other.

Herein, in the case in which the roof gusset is attached so as to extend between the roof reinforcement and the center pillar, there are two cases: a case where the attaching of the roof gusset is conducted in the vehicle-body assembling step; and the other case where the attaching of the roof gusset is conducted in the vehicle assembling step.

In the case where the attaching of the roof gusset is conducted in the vehicle assembling step, the roof gusset is fixed to the roof reinforcement and the center pillar, respectively, by bolt fastening. In this case, however, there is a concern that when bolts for fixing the roof gusset are fastened to the roof reinforcement in the vehicle assembling step after the thermosetting adhesive agent between the roof reinforcement and the roof panel has been cured in the painting step, the roof panel may have some strain (deformation) which may occur due to a tension or compression of the roof panel that are caused by dimensional errors or inferior fastening by workers.

Meanwhile, in the case where the attaching of the roof gusset is conducted in the vehicle-body assembling step, the roof gusset is attached before the above-described thermosetting adhesive agent has been cured. In this case, in order to improve the production efficiency, the roof gusset is made integrated with a center-pillar side (a vehicle-body side-portion side) by previously welding the outward end portion of the roof gusset to the center pillar directly or via the roof rail before the assembling of the vehicle-body side portion and the vehicle-body upper portion, and then after welding of the Mohican portion, the inward end portion of the roof gusset is fixed to the roof reinforcement by bolts.

In the case where the bolt fastening of the roof gusset is conducted in the vehicle-body assembling step as described above, if the above-described dimensional errors or inferior fastening by workers are within a certain degree, the tension or compression of the roof panel by the roof reinforcement can be properly restrained because of the fluidity of the thermosetting adhesive agent at this moment, so that the strain (deformation) of the roof panel can be prevented properly. Herein, with respect to a welding portion of the roof gusset to the center-pillar side, any inferior fastening by workers may not occur because the welding is conducted by positioning the roof gusset with jigs.

However, in the case where the roof gusset is attached in the vehicle-body assembling step, if the roof gusset is previously made integrated with the center-pillar side for improvement of the production efficiency as described above, a welding gun may interfere with the roof gusset at the time of conducting the spot welding of the Mohican portion for attaching the vehicle-body side portion to the vehicle-body upper portion. Accordingly, there occurs a problem in that a specified portion of the Mohican portion which is covered with the roof gusset from below may not be welded properly.

Herein, while it may be considered that the shape of the roof gusset is changed so as to avoid its interference with the welding gun described above, there is a concern that the rigidity of the roof gusset may decrease improperly depending on its changed shape, so that the function of load transmission from the center pillar to the roof reinforcement by the roof gusset may deteriorate.

SUMMARY OF THE INVENTION

Accordingly, an object of the present invention is to provide an upper vehicle-body structure of a vehicle which can surely prevent the strain (deformation) of the roof panel from occurring at the time of fixing the roof gusset to the roof reinforcement by bolts, provide welding to the specified portion of the panel joint portion of the Mohican portion and the like which is covered with the roof gusset from below, and properly perform the function of load transmission from the center pillar to the roof reinforcement by the roof gusset.

According to the present invention, there is provided an upper vehicle-body structure of a vehicle, comprising a pair of roof rails extending in a vehicle longitudinal direction at both end portions of a roof portion of the vehicle, a center pillar joined to the roof rail and extending downward from a joint portion thereof to the roof rail, a roof reinforcement extending in a vehicle width direction at a specified position overlapping the center pillar in the vehicle longitudinal direction, a roof panel provided to extending between the pair of roof rails over the roof reinforcement, a panel joint portion formed by plural panel portions vertically overlapping each other and welded together which include a panel portion of an outward edge portion, in the vehicle width direction, of the roof panel and a panel portion of an inward edge portion, in the vehicle width direction, of the roof rail, the panel joint portion being provided to extend in the vehicle longitudinal direction, and a roof gusset provided to extend between the center pillar and the roof reinforcement and be joined to the center pillar and the roof reinforcement, respectively, wherein the roof gusset comprises an opening portion formed at a specified portion thereof which covers part of the panel joint portion from below, a pair of front-and-rear center-pillar side joint portions provided at an outward end portion, in the vehicle width direction, thereof to be apart from each other in the vehicle longitudinal direction, the pair of front-and-rear center-pillar side joint portions being joined to the center pillar directly or via another panel member, a pair of front-and-rear first high-rigidity portions provided at specified portions thereof which overlap the opening portion in the vehicle width direction and overlap the pair of front-and-rear center-pillar joint portions in the vehicle longitudinal direction, respectively, and a second high-rigidity portion provided at an inward end portion, in the vehicle width direction, thereof to extend in the vehicle longitudinal direction.

Herein, a "high-rigidity portion" which is described for the first high-rigidity portions or the second high-rigidity portion means a specified portion of the roof gusset which shows its smaller deformation when receiving an input load, compared to another portion of the roof gusset than this specified portion.

According to the present invention, since the opening portion is formed at the roof gusset provided to extend between the center pillar and the roof reinforcement, even in a case in which the roof gusset is attached below the panel joint portion before conducting the welding of the panel joint portion of the Mohican portion where the roof rail and the roof panel are joined together, the welding gun can be inserted into the opening portion from below, so that the portion of the panel joint portion which is covered with the roof gusset from blow can be welded properly.

Further, since the first high-rigidity portions are provided at longitudinal both-side portions of the roof gusset located on both sides of the above-described opening portion in the vehicle longitudinal direction, the roof gusset can be effectively restrained from deforming when an impact load is inputted from the vehicle side, so that the impact load inputted to the pair of front-and-left center-pillar side joint portions can be effectively transmitted to the roof-reinforcement side by way of the above-described longitudinal both-side portions of the roof gusset.

Moreover, since the second high-rigidity portion extending in the vehicle longitudinal direction is provided at the inward end portion of the roof gusset, the rigidity against a compressive force acting in the vehicle longitudinal direction can be increased, so that the inward end portion of the roof gusset can be effectively restrained from deforming in a projective shape downward or upward. Thereby, the function of load transmission from the center pillar to the roof reinforcement by the roof gusset can be effectively performed.

According to an embodiment of the present invention, the second high-rigidity portion of the roof gusset includes a downward extension portion which is constituted by the inward end portion of the roof gusset which is bent so as to extend downward away from the roof reinforcement. Thereby, since a ridgeline which extends in the vehicle longitudinal direction is formed at the second high-rigidity portion, the rigidity against the compressive force acting in the vehicle longitudinal direction can be effectively increased, so that the above-described effect of restraining deformation of the roof gusset can be effectively achieved.

According to another embodiment of the present invention, the second high-rigidity portion of the roof gusset includes an inward extension portion which is constituted by a lower end portion of the downward extension which is bent so as to extend inward in the vehicle width direction. Thereby, since a pair of ridgelines extending in the vehicle longitudinal direction is formed at the second high-rigidity portion, the rigidity against the compressive force acting in the vehicle longitudinal direction can be further increased, so that deformation of the roof gusset can be further effectively restrained.

According to another embodiment of the present invention, the second high-rigidity portion of the roof gusset is provided to overlap a central portion of the opening portion in the vehicle longitudinal direction. Thereby, since the second high-rigidity portion can be provided at a specified portion which easily deforms when receiving the impact load inputted from the vehicle side, deformation of this specified portion can be efficiently restrained.

According to another embodiment of the present invention, the roof reinforcement comprises plural projection portions which project downward and extend in the vehicle width direction, respectively, and the pair of front-and-rear first high-rigidity portions overlaps the plural projection portions of the roof reinforcement in the vehicle width direction. Thereby, an angle between the center pillar and the roof reinforcement can be restrained from changing, so that the above-described function of load transmission from the center pillar to the roof reinforcement by the roof gusset can be further effectively performed.

Other features, aspects, and advantages of the present invention will become apparent from the following description which refers to the accompanying drawings.

BRIEF DESCRIPTION OF THE DRAWINGS

FIG. 5 is a side view of the roof gusset, when viewed from the inside.

FIGS. 6A and 6B are schematic views showing respective shapes of a center pillar at the timings before or after an impact load is inputted from the vehicle side

DETAILED DESCRIPTION OF THE INVENTION

First, before the description of a specific structure applied to a vehicle body according to the present invention, results of analyses which were conducted by the inventors of the present invention will be described.

Figure 7A:
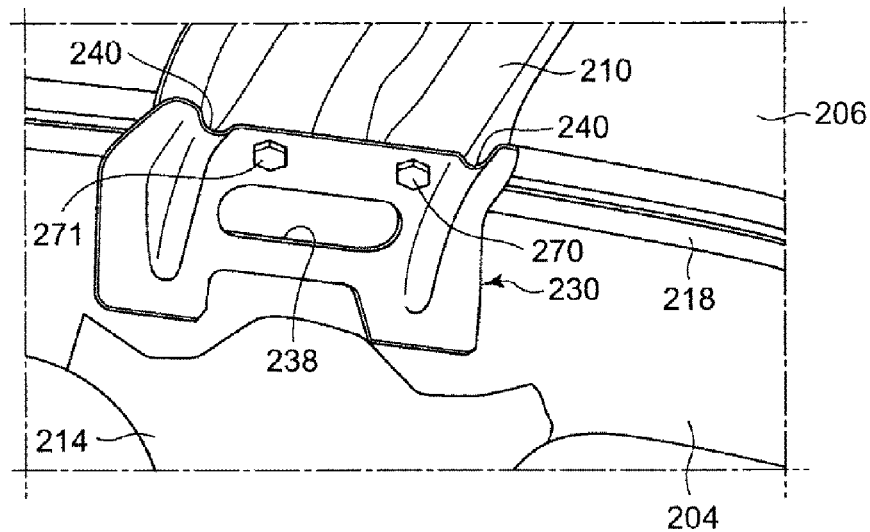
FIGS. 7A and 7B are perspective views, when viewed obliquely from below inside a vehicle compartment, respectively showing a left-side roof gusset and its surrounding portion of a vehicle-body upper structure for analysis 1 at the timings before or after a side load is inputted.

The inventors of the present invention conceived a vehicle-body upper structure shown in FIG. 7A in which an opening portion for welding 238, into which a welding gun is inserted, is provided at a central portion of a roof gusset 230 so that any interference of the roof gusset 239 with the welding gun can be avoided, and also grooves 240 are provided at longitudinal both-side portions of the roof gusset 230 located on both sides of the opening portion for welding 238 so that the rigidity of the roof gusset 230 can be restrained from decreasing due to the forming of the opening portion for welding 238. And, the inventors conducted the following analysis 1 for the vehicle-body upper structure shown in FIG. 7A.

[Analysis 1]

In the analysis 1, an analysis on condition of a vehicle side-face collision was conducted for the vehicle-body upper structure shown in FIG. 7A, and the manner of deformation of the roof gusset 230 was confirmed.

According to the vehicle-body upper structure shown in FIG. 7A, a roof rail 204 and a roof panel 206 are joined together by spot welding at a Mohican portion 218 which extends in the vehicle longitudinal direction. Further, an outward end portion, in the vehicle width direction, of a roof reinforcement 210 is also spot-welded at the Mohican portion 218, together with the roof rail 204 and the roof panel 206. The roof gusset 230 is provided to extend between a center pillar 214 and the roof reinforcement 210, and fixed, by spot welding, to the center pillar 214 via the roof rail 204 and also fixed, by bolts 270, 271, to the roof reinforcement 210. Further, the opening portion for welding 238 is formed at a specified portion of the roof gusset 230 which covers part of the Mohican portion 218 from below.

Figure 7B:
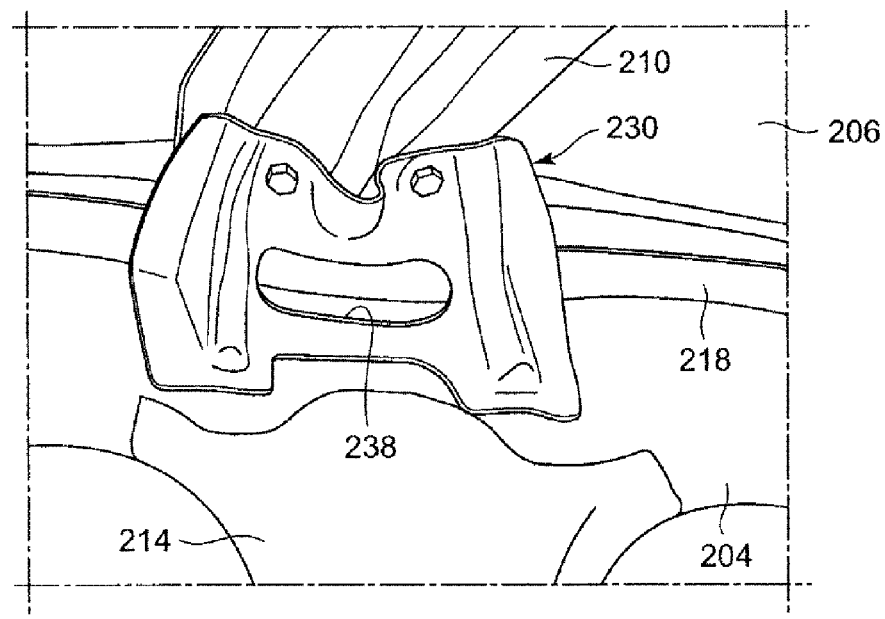

The result of the analysis 1 was, as shown in FIG. 7B, that the roof gusset 230 and its surrounding portion deformed largely, in particular an upper edge of the roof gusset 230 projected downward greatly at its central portion in the vehicle longitudinal direction. It can be considered that the main reasons for causing these deformations were such that not only a stress acting in the vehicle width direction but also a compressive stress acting in the vehicle longitudinal direction concentrated on the roof gusset 230 in the vehicle side-face collision, and also the rigidity of a specified portion of the roof gusset 230 located above the opening portion for welding 238 against a compressive force acting in the vehicle longitudinal direction decreased due to the forming of the opening portion for welding 238. The above-described large deformation of the roof gusset 230 causes problems in that the load transmission from the center pillar 214 to the roof reinforcement 210 by way of the roof gusset 230 may deteriorate and the welding of the roof gusset 230 to the roof reinforcement 204 may be easily detached.

Figure 8A:
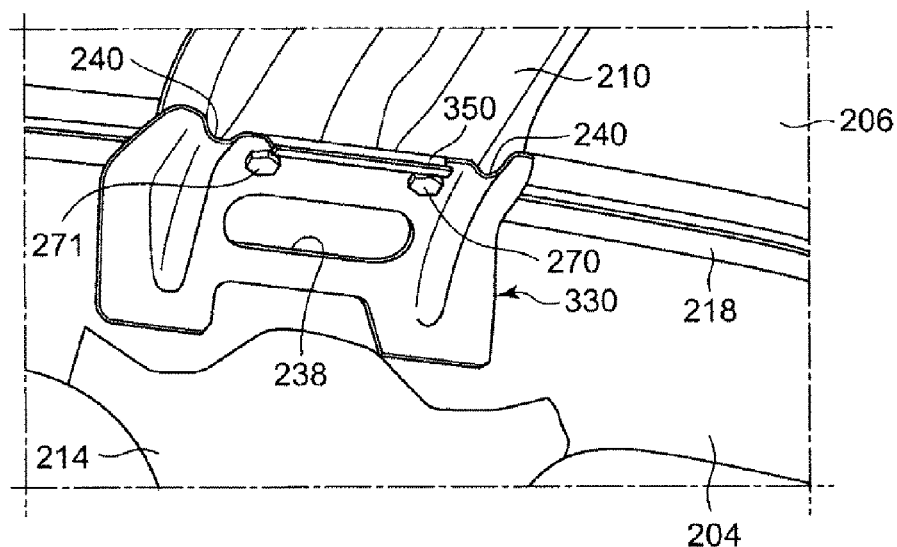
FIGS. 8A and 8B are perspective views, when viewed obliquely from below inside the vehicle compartment, respectively showing a left-side roof gusset and its surrounding portion of a vehicle-body upper structure for analysis 2 at the timings before or after the side load is inputted.

Accordingly, the inventors of the present invention conceived another vehicle-body upper structure shown in FIG. 8A in which an L-shaped bending portion 350 is formed at an inward edge portion, in the vehicle width direction, of a roof gusset 330 so as to provide a ridgeline extending in the vehicle longitudinal direction, thereby increasing the rigidity of the upper edge portion of the roof gusset 330 against the compressive force acting in the vehicle longitudinal direction. Thus, the inventors conducted the following analysis 2 for the vehicle-body upper structure shown in FIG. 8A.

[Analysis 2]

In the analysis 2, an analysis on the same condition of the vehicle side-face collision as the analysis 1 was conducted for the vehicle-body upper structure shown in FIG. 8A, and the manner of deformation of the roof gusset 330 was confirmed.

Herein, the vehicle-body upper structure shown in FIG. 8A includes the roof gusset 330 which is the same as the roof gusset 230 of the vehicle-body upper structure shown in FIG. 7A, except the above-described bending portion 350.

Figure 8B:
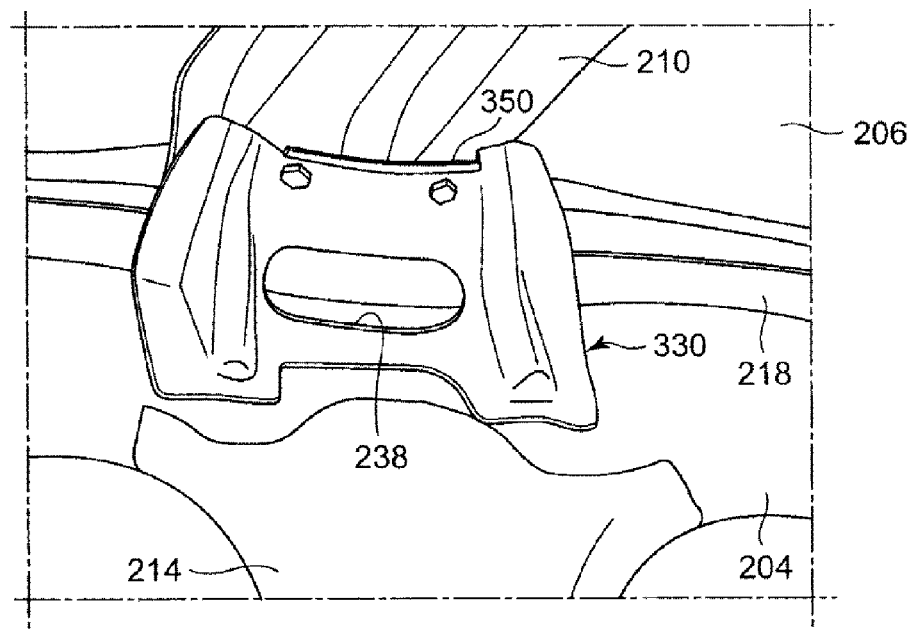

The result of the analysis 2 was, as shown in FIG. 8B, that it was confirmed that deformation of the roof gusset 330 could be effectively restrained, compared to the analysis 1 (see FIGS. 7A and 7B). In particular, the downward-projection deformation seen in the analysis 1 did not occur at the inward edge portion, in the vehicle width direction, of the roof gusset 330. This is because it can be considered that the rigidity of the inward edge portion of the roof gusset 330 against the compressive force acting in the vehicle longitudinal direction was effectively increased.

From the results of the analyses 1 and 2, the inventors found that providing the high-rigidity portion, such as the above-described groove 240 or the bending portion 350, at the roof gusset can restrain decrease of the rigidity due to the forming of the opening portion for welding, so that deformation of the roof gusset at the time of the side load being inputted can be effectively restrained. Thus, it was found by the inventors that the function of load transmission from the center pillar to the roof reinforcement by the roof gusset can be effectively performed.

The present invention has been devised in view of the above-described things, and hereinafter, a preferred embodiment of the present invention will be described specifically.

EMBODIMENT

Hereafter, the present embodiment will be described specifically referring to the accompanying drawings. Herein, the terms of directions, such as "front," "rear," "longitudinal," "right," "left," or "lateral," mean respective directions when a proceeding direction of a vehicle is considered as "front", unless there is any special description on this.

Figure 1:
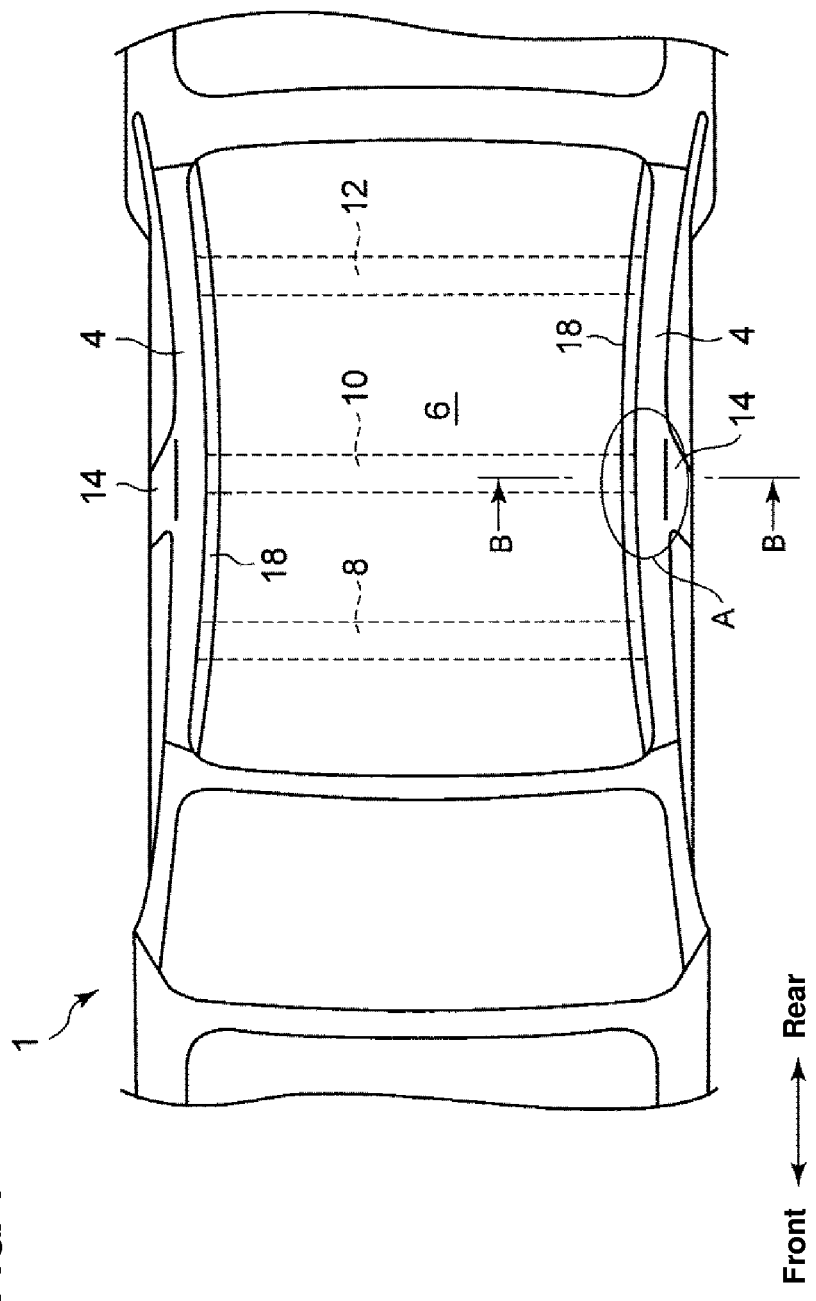
FIG. 1 is a plan view showing an upper vehicle-body structure of a vehicle according to an embodiment of the present invention.

FIG. 1 is a plan view showing an upper vehicle-body structure of a vehicle 1 according to the present embodiment. As shown in FIG. 1, a pair of roof rails 4 which extends in the vehicle longitudinal direction is provided at both end portions of a roof portion of the vehicle 1, and a center pillar 14 which extends downward from each of the roof rails 4 is joined to a central portion, in the vehicle longitudinal direction, of the roof rail 4.

Further, plural roof reinforcements 8, 10, 12 which extend in the vehicle width direction are provided between the right-and-left roof rails 4. Specifically, the first roof reinforcement 8, the second roof reinforcement 10, and the third roof reinforcement 12 are provided in order from the vehicle front. The second roof reinforcement 10 is positioned so as to overlap the center pillar 14 in the vehicle longitudinal direction. A roof panel 6 is provided to extend between the right-and-left roof rails 4 above the roof reinforcements 8, 10, 12. A pair of groove-shaped Mohican portions 18 which extends in the vehicle longitudinal direction along the pair of roof rails 4 is provided at the roof portion of the vehicle 1. The roof panel 6 and the roof rail 4 are joined together at the Mohican portion 18.

Figure 2:
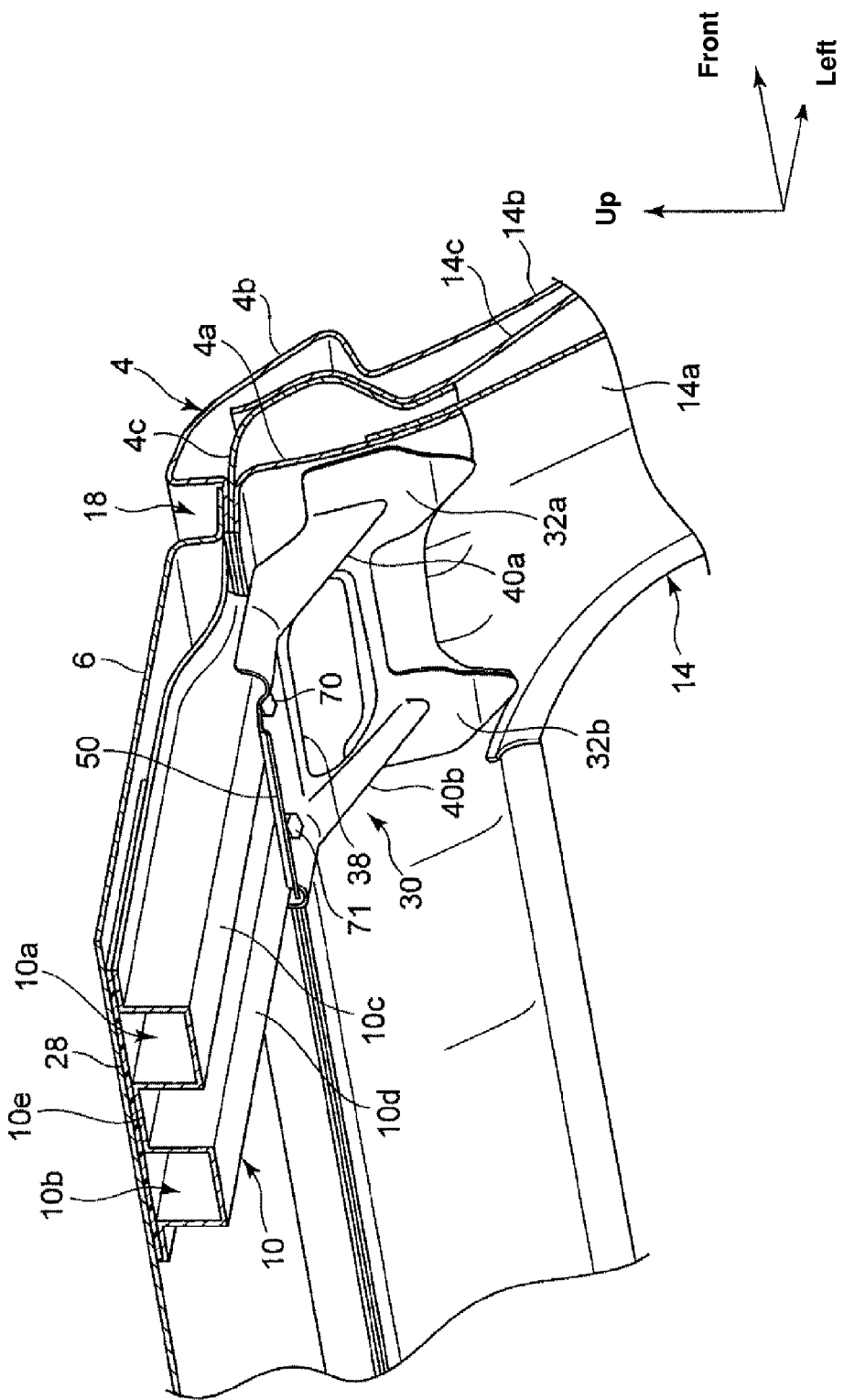
FIG. 2 is a perspective view of an A portion of the upper vehicle-body structure shown in FIG. 1, when viewed obliquely from the front.

A structure of a joint portion of the center pillar 14 and the second roof reinforcement 10 relative to the left-side roof rail 4 and its surrounding portion will be described referring to FIGS. 2 and 3. FIG. 2 is a perspective view of an A portion shown in FIG. 1, when viewed obliquely from the front, and FIG. 3 is a sectional view taken along line B-B of FIG. 1.

While a left-side part of the upper vehicle-body structure illustrated will be described, a right-side part of that is the same as the left-side part.

Figure 3:
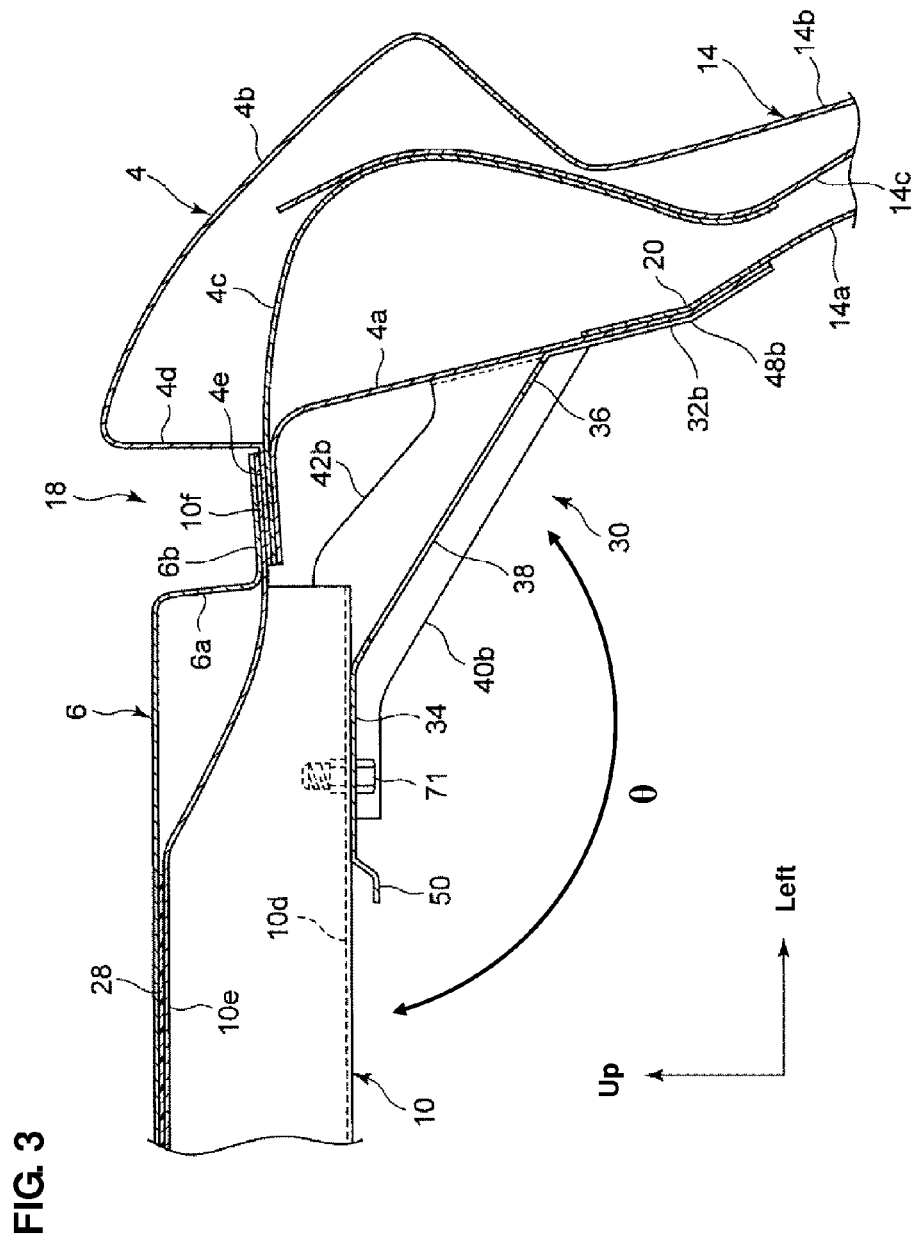
FIG. 3 is a sectional view taken along line B-B of FIG. 1.

As shown in FIG. 3, the roof panel 6 includes a downward extension portion 6a which is constituted by an outward end portion thereof which is bent so as to extend downward and an outward extension portion 6b which is constituted by a lower end portion of the downward extension portion 6a which is bent so as to extend outward. The downward extension portion 6a of the roof panel 6 constitutes an inward-side face of the Mohican portion 18, and the outward extension portion 6b of the roof panel 6 constitutes a bottom portion of the Mohican portion 18.

As shown in FIGS. 2 and 3, the second roof reinforcement 10 includes upper face portions 10a which are joined to a lower face of the roof panel 6 and a pair of front-and-rear projection portions 10a, 10b which projects downward from the upper face portions 10a and extends in the vehicle width direction.

Each of the pair of projection portions 10a, 10b of the second roof reinforcement 10 has a U-shaped cross section having an open upward. A roof gusset 30, which will be described later on, is fixed to bottom faces 10c, 10d of the projection portions 10a, 10b. These projection portions 10a, 10b are provided to extend in the vehicle width direction between the right-and-left Mohican portions 18.

The upper face portions 10e of the second roof reinforcement 10 are joined to the lower face of the roof panel 6 by a thermosetting adhesive agent 28. The upper face portions 10e are configured such that their outward end portions gradually slant downward and outward. A tip portion 10f of each of the upper face portions 10e projects outward beyond respective tip portions of the projection portions 10a, 10b, and constitutes part of the bottom portion of the Mohican portion 18.

The roof rail 4 is comprised of a roof rail inner 4a, a roof rail outer 4b, and a roof rail reinforcement 4c. The roof rail outer 4b includes a downward extension portion 4d which is constituted by an upper end portion thereof which is bent so as to extend upward and an inward extension portion 4e which is constituted by a lower end portion of the downward extension portion 4d which is bent so as to extend inward. The downward extension portion 4d of the roof rail outer 4b constitutes an outward-side face of the Mohican portion 18. An upper end of the roof rail inner 4a and an upper end of the roof rail reinforcement 4c are provided to extend substantially horizontally inward in the vehicle width direction, and constitute the bottom portion of the Mohican portion 18 together with the inward extension portion 4e of the roof rail outer 4b.

Thus, five sheets of the outward extension portion 6b of the roof panel 6, the tip portion 10f of the second roof reinforcement 10, the inward extension portion 4e of the roof rail outer 4b, the upper end portion of the roof rail reinforcement 4c, and the upper end portion of the roof rail inner 4a overlap each other in order from above at a portion of the bottom portion of the Mohican portion 18 which overlaps the second roof reinforcement 10 in the vehicle longitudinal direction, and these are joined together by spot welding. Herein, at other portions of that which does not overlap the roof reinforcements 8, 10, 12 in the vehicle longitudinal direction, four sheets of the panel portions 6b, 4e, 4c, 4a, excluding the tip portion 10f of the second roof reinforcement 10, vertically overlap each other. The Mohican portion 18 constitutes a panel joint portion where the plural panel portions vertically overlap each other and are welded together as described above.

Further, the center pillar 14 is comprised of a pillar inner 14a, a pillar outer 14b, and a pillar reinforcement 14c. The pillar inner 14a is made overlap and welded to an outward side, in the vehicle width direction, of a lower end portion of the roof rail inner 4a. A bending portion 20 which bends toward the inside of a vehicle compartment is provided at a joint portion of the pillar inner 14a to the roof rail inner 4a. The pillar outer 14b is formed integrally with and continuously to a lower portion of the roof rail outer 14b. However, the pillar outer 14b and the roof rail outer 14b may be formed separately and then joined together. The pillar reinforcement 14c is made overlap and welded to an outward side of the roof rail reinforcement 4c.

The joint portion of the center pillar 14 and the second roof reinforcement 10 relative to the roof rail 4 is constituted as described above, the roof gusset 30 is provided at this joint portion so as to extend between the center pillar 14 and the second roof reinforcement 10.

In the present embodiment, the roof gusset 30 is fixed, by spot welding, to the center pillar 14 via the roof rail inner 4a, and also fixed, by the bolts 70, 71, to the second roof reinforcement 10. Herein, the roof gusset 30 may be directly joined to the center pillar 14.

Thus, the roof gusset 30 interconnecting the center pillar 14 and the second roof reinforcement 10 performs the function of transmitting the impact load inputted to the center pillar 14 from the vehicle side to the second roof reinforcement 10. Accordingly, the roof gusset 30 performs the impact-load transmission function properly, so that the side load inputted to the center pillar 14 can be effectively dispersed to the roof side, thereby restraining the center pillar 14 from improperly coming into the vehicle compartment.

Figure 4:
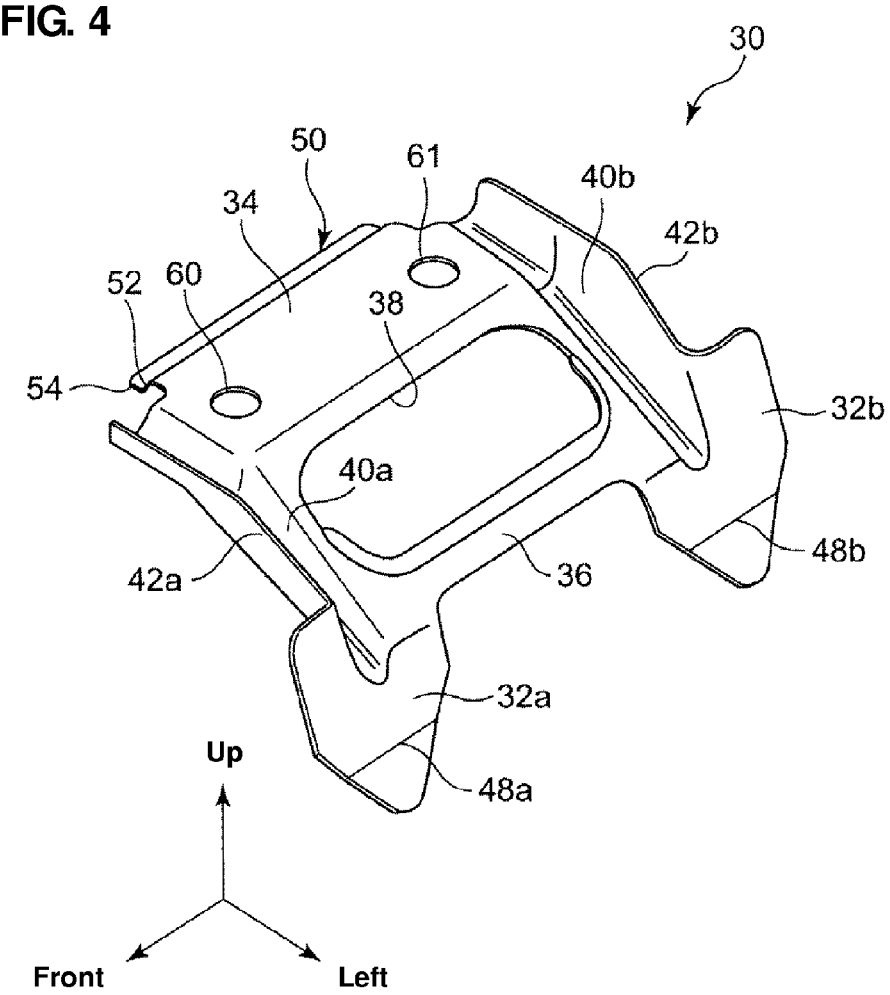
FIG. 4 is a respective view of a roof gusset, when viewed obliquely from above.

The structure of the roof gusset 30 will be described specifically referring to FIGS. 2-5. FIG. 4 is a respective view of the roof gusset 30, when viewed obliquely from above, and FIG. 5 is a side view of the roof gusset 30, when viewed from the inside.

As shown in FIGS. 2-5, the roof gusset 30 includes a roof-reinforcement side joint portion 34 which is arranged substantially horizontally. The roof-reinforcement side joint portion 34 is a substantially-rectangular panel portion which is longer in the vehicle longitudinal direction, for example. A pair of bolt through holes 60, 61 which is positioned away from each other in the vehicle longitudinal direction is formed at the roof-reinforcement side joint portion 34. The roof-reinforcement side joint portion 34 is fixed to the bottom faces 10c, 10d of the second roof reinforcement 10 by the bolts 70, 71 which are inserted into the bolt through holes 60, 61.

Further, the roof gusset 30 includes a slant face portion 36 which extends obliquely outward and downward from an outward end portion, in the vehicle with direction, of the roof-reinforcement side joint portion 34. The slant face portion 36 has substantially the same length, in the vehicle longitudinal direction, as the roof-reinforcement side joint portion 34. Also, the slant face portion 36 is arranged to pass below the Mohican portion 18 and cover part of the Mohican portion 18 from below. An opening portion for welding 38 is formed at the slant face portion 36. Thereby, even in a case in which the roof gusset 30 is attached before conducting the welding of the Mohican portion 18, a welding gun can be inserted into the opening portion for welding 38 from below, so that a portion of the Mohican portion 18 which is covered with the roof gusset 30 from blow can be welded.

Accordingly, the attaching of the roof gusset 30 can be conducted in the vehicle-body assembling step. When the bolts 70, 71 are fastened to fix the roof gusset 30 to the second roof reinforcement 10 in the vehicle-body assembling step, even if the second roof reinforcement 10 is displaced due to dimensional errors or the like, the thermosetting adhesive agent 28 positioned between the second roof reinforcement 10 and the roof panel 6 has the fluidity at this moment, so that the tension or compression of the roof panel 6 by the second roof reinforcement 10 can be restrained, thereby preventing the strain (deformation) of the roof panel 6.

A pair of center-pillar side joint portions 32a, 32b which is positioned away from each other in the vehicle longitudinal direction is formed at the outward end portion of the roof gusset 30.

The front-side center-pillar side joint portion 32a is provided so as to be continuous to a lower front-end corner portion of the slant face portion 36, and the rear-side center-pillar side joint portion 32b is provided so as to be continuous to an upper front-end corner portion of the slant face portion 36. The respective center-pillar side joint portions 32a, 32b are panel face portions which are arranged along an inner face of the roof rail inner 4a, and joined, by spot welding, to the center pillar 14 via the roof rail inner 4a. At the respective center-pillar side joint portions 32a, 32b are formed bending portions 48a, 48b which respectively have ridgelines extending in the vehicle longitudinal direction, corresponding to the above-described bending portion 20 at the joint portion of the roof rail inner 4a to the pillar inner 14a.

A pair of first high-rigidity portions 40a, 40b is formed at a front edge portion and a rear edge portion of the roof gusset 30, respectively.

The front-side first high-rigidity portion 40a is formed in a groove shape extending in the vehicle width direction along a front edge portion of the roof-reinforcement side joint portion 34 and a front edge portion of the slant face portion 36. This front-side first high-rigidity portion 40a is provided at a specified position of the roof gusset 30 which overlaps the above-described opening portion for welding 38 in the vehicle width direction and also overlaps the front-side center-pillar side joint portions 32a in the vehicle longitudinal direction. Thus, the rigidity of this portion is so increased that a front-side portion of the slant face portion 36 located in front of the opening portion for welding 38, that is—a portion to transmit the load from the front-side center-pillar side joint portions 32a to the roof-reinforcement side joint portion 34, can be restrained from deforming at the time of load input.

The rear-side first high-rigidity portion 40b is formed in a groove shape extending in the vehicle width direction along a rear edge portion of the roof-reinforcement side joint portion 34 and a rear edge portion of the slant face portion 36. This rear-side first high-rigidity portion 40b is provided at a specified position of the roof gusset 30 which overlaps the above-described opening portion for welding 38 in the vehicle width direction and also overlaps the rear-side center-pillar side joint portions 32b in the vehicle longitudinal direction. Thus, the rigidity of this portion is so increased that a rear-side portion of the slant face portion 36 located in back of the opening portion for welding 38, that is—a portion to transmit the load from the rear-side center-pillar side joint portions 32b to the roof-reinforcement side joint portion 34, can be restrained from deforming at the time of load input.

As described above, the respective first high-rigidity portions 40a, 40b can effectively restrain the front-side and rear-side portions of the roof gusset 30 located in front and back of the opening portion for welding 38 from deforming when the impact load is inputted from the vehicle side. Accordingly, the impact load inputted to the pair of center-pillar side joint portions 32a, 32b can be effectively transmitted to the roof-reinforcement side joint portion 34 by way of the front-side and rear-side portions of the roof gusset 30 located in front and back of the opening portion for welding 38.

Herein, the front wall portion 42a of the front-side first high-rigidity portion 40a and the rear wall portion 42b of the rear-side first high-rigidity portion 40b are formed so as to stand up higher than the roof-reinforcement side joint portion 34 and the slant face portion 36, thereby further increasing the rigidity of the first high-rigidity portions 40a, 40b.

Meanwhile, a second high-rigidity portion 50 which extends in the vehicle longitudinal direction is provided at an inward end portion, in the vehicle width direction, of the roof gusset 30.

Specifically, the second high-rigidity portion 50 includes a downward extension portion 52 which is constituted by an inward end portion, in the vehicle width direction, of the roof-reinforcement side joint portion 34 which is bent so as to extend downward away from the second roof reinforcement 10 and an inward extension portion 54 which is constituted by a lower end portion of the downward extension 52 which is bent so as to extend inward in the vehicle width direction. Thus, since the second high-rigidity portion 50 has a pair of upper-and-lower ridgelines which extend in the vehicle longitudinal direction at upper and lower edges of the lower extension portion 52, the rigidity against the compressive force acting in the vehicle longitudinal direction can be further increased. Accordingly, it can be effectively restrained that the roof-reinforcement side joint portion 34 projects downward or upward when the impact load is inputted from the center pillar 14.

The second high-rigidity portion 50 is formed over sustainably a whole length of the roof-reinforcement side joint portion 34 in the vehicle longitudinal direction. However, the longitudinal length of the second high-rigidity portion 50 is not limited in particular. The second high-rigidity portion 50 is provided to overlap a central portion of the opening portion for welding 38 in the vehicle longitudinal direction, so that the rigidity of a specified portion of the roof-reinforcement side joint portion 34 which easily deforms when receiving the impact load can be increased, thereby restraining deformation of this specified portion efficiently.

As described, since the first high-rigidity portions 40a, 40b and the second high-rigidity portion 50 are provided at the roof gusset 30, the roof gusset 30 can be effectively restrained from deforming at the time of load input. Thereby, the function of load transmission from the center pillar 14 to the second roof reinforcement 10 by the roof gusset 30 can be effectively performed.

Additionally, the second roof reinforcement 10 comprises the projection portions 10a, 10b extending in the vehicle width direction, and the first high-rigidity portions 40a, 40b overlap the projection portions 10a, 10b in the vehicle width direction (see FIG. 3). Thereby, an angle θ between the center pillar 14 and the second roof reinforcement 10 (see FIG. 3) can be restrained from changing. Accordingly, the above-described function of load transmission from the center pillar 14 to the second roof reinforcement 10 by the roof gusset 30 can be further effectively performed.

FIG. 6A is a schematic view showing a shape of the center pillar 14 before the center pillar 14 is deformed, when viewed from the vehicle front. FIG. 6B is a schematic view showing a shape of the center pillar 14 after the center pillar 14 is deformed by an object 90 colliding from the vehicle side, when viewed from the vehicle front. Herein, solid lines shown in FIGS. 6A and 6B indicate shapes of the respective members according to the present embodiment, and one-dotted broken lines shown in FIG. 6B indicate shapes of the respective members in a case in which the second high-rigidity portion 50 is not provided at the roof gusset 30.

As shown in FIG. 6B, according to the present embodiment, deformation of the roof gusset 30 can be effectively restrained by the functions of the first high-rigidity portions 40a, 40b and the second high-rigidity portion 50, so that the load transmission function of the roof gusset 30 can be properly performed. Thereby, the side load inputted to the center pillar 14 can be effectively dispersed to the roof side, thereby restraining the center pillar 14 from improperly coming into the vehicle compartment effectively, compared to a case in which the second high-rigidity portion 50 is not provided.

The present invention should not be limited to the above-described embodiment, and any other modifications or improvements may be applied within the scope of a sprit of the present invention.

For example, while the above-described embodiment describes the case in which the first high-rigidity portions 40a, 40b are formed in the groove shape and the second high-rigidity portion 50 is formed in the bending shape having the two ridgelines, the structures of the first high-rigidity portions 40a, 40b and the second high-rigidity portion 50 are not to be limited in particular as long as deformation of these high-rigidity portions for the input load is less than that of the other portion of the roof gusset 30 than these high-rigidity portions. Therefore, the first high-rigidity portions 40a, 40b may be formed in a bending shape having one or plural ridgelines, or comprised of a bead-shaped portion or a think plate portion which project upward. Meanwhile, the second high-rigidity portion 50 may be formed in groove shape or in a bending shape having a single ridgeline or three or more ridgelines, or comprised of a bead-shaped portion or a think plate portion which project upward.

What is claimed is:

1. An upper vehicle-body structure of a vehicle, comprising:
    a pair of roof rails extending in a vehicle longitudinal direction at both end portions of a roof portion of the vehicle;
    a center pillar joined to said roof rail and extending downward from a joint portion thereof to the roof rail;
    a roof panel provided to extend between said pair of roof rails;
    a roof reinforcement extending in a vehicle width direction at a specified position which is located beside said center pillar, the roof reinforcement being joined to a lower face of said roof panel and including a pair of front-and-rear projection portions which respectively project downward from the roof panel and extend in the vehicle width direction;
    a Mohican panel joint portion formed by plural panel portions vertically overlapping each other and welded together which include a panel portion of an outward edge portion, in the vehicle width direction, of said roof panel and a panel portion of an inward edge portion, in the vehicle width direction, of said roof rail, the Mohican panel joint portion being provided to extend in the vehicle longitudinal direction; and
    a roof gusset provided to extend between said center pillar and said roof reinforcement and be joined to the center pillar and the roof reinforcement, respectively,
    wherein said roof gusset comprises:
    a roof-reinforcement side joint portion provided at an inward end portion, in the vehicle width direction, thereof, the roof-reinforcement side joint portion having a pair of bolt holes arranged to be apart from each other in the vehicle longitudinal direction, the roof-reinforcement side joint portion being fixedly joined to respective lower-end portions of said pair of front-and-rear projection portions of the roof reinforcement by a pair of bolts inserted through said pair of bolt holes;
    a pair of front-and-rear center-pillar side joint portions provided at an outward end portion, in the vehicle width direction, thereof to be apart from each other in the vehicle longitudinal direction, the pair of front-and-rear center-pillar side joint portions being joined to the center pillar directly or via another panel member;
    a slant face portion extending obliquely and interconnecting said roof-reinforcement side joint portion and said pair of front-and-rear center-pillar side joint portions, the slant face portion having an opening portion for welding-gun insertion at a central portion thereof, through which a welding gun being configured to be inserted for welding of said Mohican panel joint portion;
    a pair of front-and-rear first high-rigidity portions provided at front-and-rear end portions thereof, the front first high-rigidity portion being configured to extend in the vehicle width direction continuously along a front edge portion of said roof-reinforcement side joint portion and a front edge portion of said slant face portion so as to connect to said front center-pillar side joint portion, the rear first high-rigidity portion being configured to extend in the vehicle width direction continuously along a rear edge portion of said roof-reinforcement side joint portion and a rear edge portion of said slant face portion so as to connect to said rear center-pillar side joint portion; and
    a second high-rigidity portion to increase a rigidity of the roof gusset against a compressive force acting on the roof gusset in the vehicle longitudinal direction, the second high-rigidity portion being provided at an inward end portion, in the vehicle width direction, of said roof-reinforcement side joint portion, the second high-rigidity portion being configured to extend in the vehicle longitudinal direction along an inward edge portion of said roof-reinforcement side joint portion, without connecting to said pair of front-and-rear first high-rigidity portions at front-and-rear inward corners of the roof-reinforcement side joint portion.

2. The vehicle-body side portion structure of a vehicle of claim 1, wherein said second high-rigidity portion of the roof gusset includes a downward extension portion which is constituted by the inward end portion of the roof gusset which is bent so as to extend downward away from said roof reinforcement, the downward portion being configured to be spaced apart from said pair of front-and-rear first high-rigidity portions in both the vehicle width direction and the vehicle longitudinal direction.

3. The vehicle-body side portion structure of a vehicle of claim 2, wherein said second high-rigidity portion of the roof gusset further includes an inward extension portion which is constituted by a lower end portion of said downward extension which is bent so as to extend inward in the vehicle width direction apart from said pair of front-and-rear first high-rigidity portions.

4. The vehicle-body side portion structure of a vehicle of claim 1, wherein the front first high-rigidity portion is formed in a groove shape such that a front wall portion of the front first high-rigidity portion stands up higher than the roof-reinforcement side joint portion and the slant face portion, and the rear first high-rigidity portion is formed in a groove shape such that a rear wall portion of the rear first high-rigidity portion stands up higher than the roof-reinforcement side joint portion and the slant face portion.

* * * * *